Feb. 12, 1929.

C. A. CAMPBELL

1,702,152

ELECTROPNEUMATIC BRAKE VALVE

Filed Oct. 7, 1927   3 Sheets-Sheet 1

Patented Feb. 12, 1929.

1,702,152

UNITED STATES PATENT OFFICE.

CHARLES A. CAMPBELL, OF WATERTOWN, NEW YORK, ASSIGNOR TO THE NEW YORK AIR BRAKE COMPANY, A CORPORATION OF NEW JERSEY.

ELECTROPNEUMATIC BRAKE VALVE.

Application filed October 7, 1927. Serial No. 224,718.

This invention relates to railway brakes, and particularly to the so-called electropneumatic type now used in high speed traction service, but not necessarily confined to that field of use alone.

Generally stated, the ordinary component elements of such a system are a brake cylinder, auxiliary reservoir and triple valve, conforming in a general way to known practice in automatic air brakes, and a number of electrically actuated valves, usually three, which exert a modifying effect on the functions of the triple valve and which are controlled by a switch operated synchronously with the engineer's brake valve to control the electric valve circuits simultaneously throughout the train.

One electric valve, commonly known as the emergency magnet valve, operates to produce an emergency function of the triple valve. This is done as a rule by venting the brake pipe air to atmosphere. The emergency magnet valve is rendered active when the engineer's brake valve is in emergency position.

The second electric valve is known as the service magnet valve and functions to produce a moderate reduction of brake pipe pressure when the engineer's brake valve is moved to service position. It may accomplish this result in a variety of ways, but venting of the brake pipe air at a restricted rate to the brake cylinder is preferred.

The release magnet valve is the third of the group and is in effect a retaining valve operable to close the exhaust port from the triple valve.

The purpose of the release valve is to permit graduated release and to permit recharge of the auxiliary reservoirs while the brakes are held applied. To accomplish this the valve is given a position known as "holding position" in which the valve functions as in "release", but in which, unlike release the release magnet valve is actuated. It thus becomes possible to recharge the auxiliary reservoirs without releasing the brakes by moving the engineer's brake valve to holding position, and to produce a graduated release of the brakes by shifting the engineer's brake valve alternately between running and holding positions.

With brakes of this character high brake cylinder pressures are often required particularly in emergency, and if only one auxiliary reservoir is used, it is obvious that large reservoirs and relatively high brake pipe pressures must be used. The brake cylinder pressure in emergency can be made higher by using a supplemental reservoir which is drawn upon in emergency, or by using main reservoir pressure in emergency, or by using a combination of the two. Where the supplemental reservoir is used the release of the brakes is sluggish, and where main reservoir pressure is used it is difficult to release the brakes at all, because brake cylinder and auxiliary reservoir pressure may be raised to a point at which they exceed the normal brake pipe pressure with the result that the triple valve can not move to release position.

One important purpose of the present invention, therefore, is to produce a device of this character in which supplemental reservoir pressure or main reservoir pressure, or both, may be used in emergency braking, and in which rapid release following emergency will be secured. This result is attained by certain details of construction of the electro-pneumatic valve mechanism and its relation to the triple valve mechanism.

Generally stated, the release magnet valve operates to admit air to and exhaust it from a pneumatically operated valve which performs the retaining function. The air for operating the pneumatically operated valve is taken from the slide valve chamber of the triple valve which is partially isolated from the auxiliary reservoir by means of a choke. This accelerates release. Furthermore, when the release magnet valve vents the pneumatically actuated retaining valve, it also vents the slide valve chamber unless and until this valve is in release position.

Another important feature of the present invention is the combination with an electropneumatic valve including what is essentially a plain triple valve of an emergency vent valve mechanism so contrived that in addition to its ordinary functions it will produce an emergency application if brake pipe pressure is reduced at an extremely low rate, such a low rate reduction, for example, as occurs when a brake pipe is frozen and leakage from the system gradually depletes the pressure. This emergency valve is claimed broadly in my copending application Serial No. 208,629 filed July 26, 1927, and hence is claimed in the present application only in a special relation. Normally the valve functions to produce an emergency application by purely pneumatic means. In the present device it is so combined with an electro-pneumatic brake valve that by pneumatic means it admits main reservoir air to the brake cylinder and serves as the sole means for performing this function in the general combination claimed. Further, it operates through electrical means to cause all the emergency magnet valves throughout the train to function and cause simultaneous emergency application on all cars of the train. This last feature is of particular importance because the slow emergency function is likely to be local to a single car and if the emergency function were confined to that car, as it would be in the case of frozen hose, a break-in-two is likely to occur. The electric connections, by insuring simultaneous emergency throughout the train, will eliminate this risk.

Figure 1:
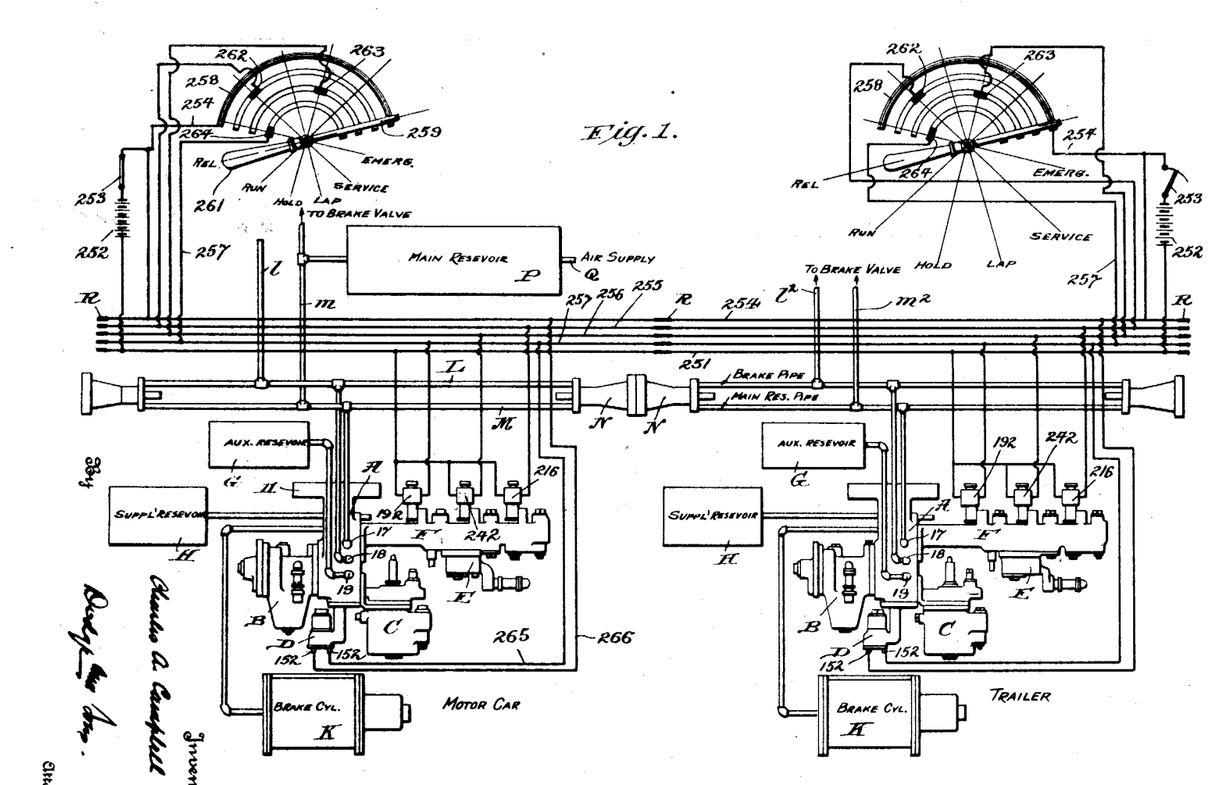
Fig. 1 is a piping and wiring diagram of the complete system for a two-car train, (motor car and trailer).

In Fig. 1 the engineer's brake valves are omitted altogether, and the switching mechanisms which are operated in synchronism with corresponding brake valves, as is common practice, are shown only in diagram.

In Figs. 2 to 6 inclusive, a familar diagrammatic method of showing the ports has been adopted by which all the ports are shown in the plane of section to permit their simultaneous functions to be traced, but it will be understood that a more compact arrangement is possible by a somewhat different location of the ports, as will be readily understood by those skilled in the art.

Figures 2, 4:
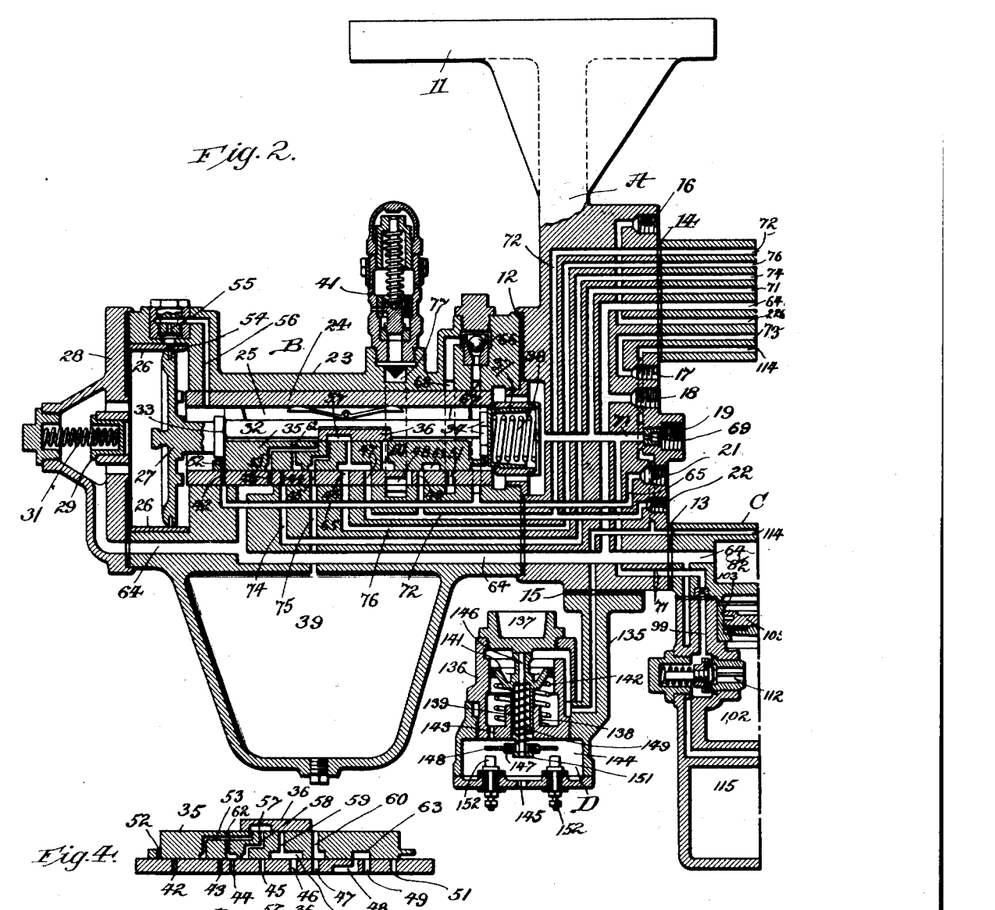
Fig. 2 is a vertical axial section of the pipe bracket, the triple valve and the pneumatically actuated emergency switch.
Fig. 4 is a fragmentary view of the triple slide valve with its graduating valve and seat, showing the parts in service position.
Figures 3, 7:
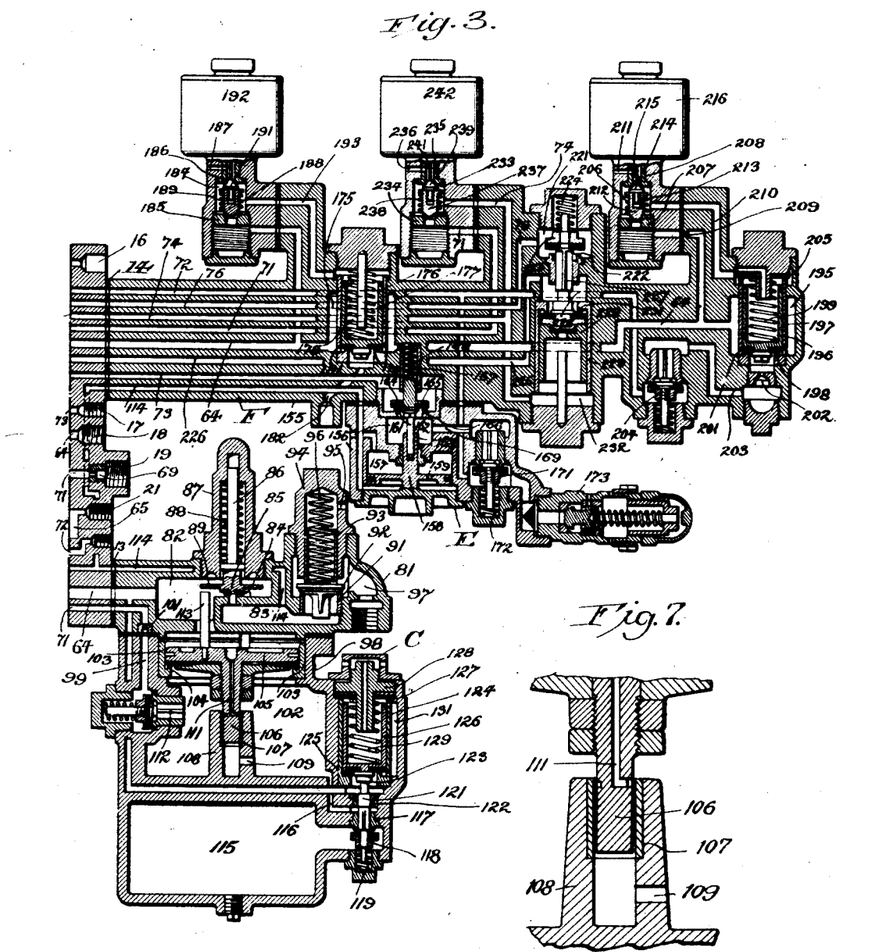
Fig. 3 is a vertical axial section of the electro-pneumatic valve mechanism and of the emergency valve mechanism.
Fig. 7 is an enlarged view of a portion of Fig. 3.
Figures 5, 6:
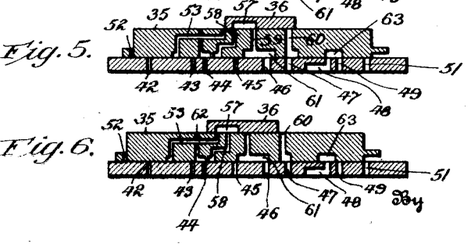
Fig. 5 is a similar view showing the parts in service lap position.
Fig. 6 is a similar view showing the parts in emergency position.

Figs. 2 and 3 together form a complete vertical section of the improved electro-pneumatic valve mechanism.

In order to simplify the tracing of the ports, fragmentary portions of the electro-pneumatic mechanism and of the emergency valve mechanism have been shown in position as portions of Fig. 1, and the fragmentary portion of the pipe bracket has been included as a portion of Fig. 2.

The complete valve is made up of six units, which are designated on the drawing by letters. The entire device is supported by a pipe bracket A to which all pipe connections are made and against ported faces of which four of the other units are bolted in sealing relation. The triple valve unit is shown at B; the emergency valve unit is shown at C; the pneumatically actuated emergency switch is shown at D; the main reservoir by-pass valve is shown at E; and the electro-pneumatic valve unit is shown at F.

*Pipe bracket.*

The pipe bracket A is formed with an attaching flange 11 and is provided with a plurality of through passages, which will be described after the triple valve mechanisms have been explained. There is a ported face with a gasket, indicated by the numeral 12, by means of which the triple valve unit B is sealed to the bracket; a ported face with ported gasket, indicated generally by the numeral 13, by means of which the emergency unit C is sealed to the bracket A; a ported face and ported gasket 14 by means of which the electro-pneumatic valve unit F is sealed to the bracket, and the ported face with ported gasket, indicated generally by the numeral 15, by means of which the pneumatically actuated emergency switch D is sealed to the pipe bracket. There is an exhaust connection 16, shown threaded, to permit the attachment of an exhaust pipe if desired; a threaded main reservoir connection 17; a threaded brake pipe connection 18; a threaded auxiliary reservoir connection 19; a threaded supplemental reservoir connection 21; and a threaded brake cylinder connection 22.

*Triple valve unit.*

The triple valve unit B consists of a body 23 provided with the usual valve bushing 24 enclosing the usual slide valve chamber 25 and a cylinder bushing 26 forming the cylinder in which the triple piston 27 works. There is also the usual front cap 28, a graduating thimble 29, and a graduating spring 31. The piston 27 has the usual rod 32 which is formed with lugs 33 and 34 arranged to collide with and move the triple slide valve 35 but to permit some lost motion of the piston relatively to the valve. Mounted on the triple slide valve 35 is a graduating valve 36 which is confined in a notch in the rod 32 so that it has no lost motion relatively thereto. The end of the rod 32 coacts with a retard stop 37 urged to the left by a retard spring 38, the parts being so arranged that the retard stop 37 arrests the piston 27 in normal charging position, but if the spring 38 be overpowered, will permit the piston to move to the right a slight distance to a quick charging position.

Formed in the lower portion of the body 23 is a quick service chamber 39 which in release position is at atmospheric pressure and into which brake pipe air is vented as the valve starts toward service position to accelerate the service movement of the piston 27. Mounted on the body 23 is a safety valve or relief valve 41 of known construction, whose function is to vent excessive brake cylinder pressure in service applications. The bushing 24 is formed with a ported seat for the valve 35, as is usual, and the ports in said seat are as follows: a supplemental reservoir charging port 42, an auxiliary reservoir charging port 43, a releasing vent port 44, quick service port 45, exhaust port 46, brake cylinder port 47, safety valve port 48, brake cylinder port 49 and supplemental reservoir equalizing port 51. The supplemental reservoir charging port 42 coacts with the through port 52 in the slide valve 35 and is open only in normal release and recharge position, which is the position shown in Fig. 2. Charging of the supplemental reservoir therefore occurs only when the releasing pressure wave in the brake pipe is not abnormally high. The auxiliary reservoir charging port 43 is controlled by the slide valve 35 and registers with a through port 53 in both the release and recharge positions of the valve, namely, that shown in Fig. 2 and that which occurs when the piston 27 overpowers retard stop spring 38. When the retard stop spring 38 is so overpowered the piston 27 moves beyond a feed port 54 in bushing 26 and an additional charging passage is opened by way of choke 55 and passage 56 to slide valve chamber 25.

In starting to service the graduating valve 36 first moves relatively to the valve 35 which is then at rest, and functions first to blank the port 53 and then to connect the port 53, by means of recess 57, with port 58 which extends through the slide valve 35 and is then in register with the quick service port 45. The port 58 and recess 57, in addition to the functions just described, serve in the release and recharge positions to connect port 45 with port 59 in the slide valve 35 and hence with the exhaust recess 61 and exhaust port 46. The release vent port 44 is blanked by the slide valve 35 in both release and recharge positions but is connected by port 62 in the slide valve 35 with the valve chamber 25 in service, service lap and emergency positions. This release vent port is the passage through which air is vented, under the control of the electro-pneumatic mechanism, from the valve chamber 25 to accelerate the releasing movement of the piston 27. Recess 61 serves to connect the brake cylinder port 47 and the exhaust port 46 in both release and recharge positions. The brake cylinder port 47 also coacts with the through port 60 in the slide valve 35 which registers with it in service, service lap and emergency positions.

In service and emergency positions auxiliary reservoir air flows from the valve chamber 25 to the brake cylinder through these registering ports, but in service lap position the port 60 is blanked by the graduating valve 36. The safety valve port 48 and the brake cylinder port 49 are connected with each other by a recess 63 in the slide valve 35 in service, and service lap positions only. At all other times they are blanked. The supplemental reservoir equalizing port 51 is blanked by the slide valve 35 in all positions except emergency. In emergency it is cleared by the slide valve 35 to permit supplemental reservoir air to flow to the valve chamber 25.

Between the brake pipe connection 18 and the space within the front cap 28 to the left of the piston 27 there extends a brake pipe passage 64 which has branches, one extending to the charging port 43, another extending into the emergency valve mechanism C, hereinafter described, and a third extending into the electro-pneumatic mechanism F hereinafter described. Extending from the supplemental reservoir connection 21 is a supplemental reservoir passage 65 which has one branch extending to the charging port 42, and a branch extending past the check valve 66 to the equalizing port 51. This second branch passage is made up in part of grooves 67 and 68 which are formed within the body 23 and extend around the bushing 24, as is indicated on Fig. 2. The auxiliary reservoir connection 19 communicates through a choke 69 with a passage 71 which leads to the triple valve chamber 25. The capacity of the choke 69 is such as to restrict flow to and from the auxiliary reservoir for the purpose of allowing a uniform rate of brake applications on mixed sizes of equipments. There are branches from the passage 71 which lead both to the electro-magnetic valve unit F and to the emergency valve unit C, as will be hereafter described. The brake cylinder connection 22 communicates with a passage 72 which connects with the brake cylinder ports 47 and 49 and which also has a branch leading to the electro-pneumatic valve unit F. The main reservoir connection 17 leads to a passage 73 which extends into the electro-pneumatic valve portion F. The release vent port 44 in the slide valve seat communicates with the passage 74 which leads to the electro-pneumatic valve portion F, as will be later described. The quick service port 45 is connected by passage 75 with the quick service chamber 39. The exhaust port 46 is connected by passage 76 with the interior of the electro-pneumatic valve unit F. This is the passage which leads to the electro-pneumatically actuated retaining valve and by controlling it the retaining valve thus controls exhaust of the triple valve. Safety valve port 48 is connected to the safety valve 41 by passage 77 which is formed in the body 23 and which is shown partly in dotted lines in Fig. 2.

The triple valve above described has many of the characteristics of a plain triple valve. It is not strictly necessary to certain features of the invention that a supplemental reservoir be used at all, or that the valve be capable of giving two charging rates, or that it be equipped with the quick service chamber 39. The changes to eliminate any or all of the features above mentioned will be obvious to those skilled in the art and need not be discussed.

With this device is used an emergency valve which, in its broadest aspects, is merely a brake pipe vent valve, but which in the particular combination here involved possesses certain incidental features by means of which the response of any emergency valve in a train causes, through electrical means, the functioning of all emergency valves in the train. Another incidental feature of the emergency valve is the control of admission of main reservoir air to the brake cylinder in emergency.

Emergency valve.

The upper and supporting portion of the emergency valve unit C consists of a casting 81 formed with a chamber 82 to which the branch of the passage 64 already mentioned leads. Into this chamber there projects a hollow member formed as a unitary portion of the casting, the hollow member being provided with a vent port 83 which leads to and terminates in an upwardly facing valve seat 84. A vent valve 85 coacts with this seat and is guided by a shouldered stem 86 slidably mounted in a housing 87. The housing 87 is screwed into the casting 81 and serves to enclose and sustain a coil spring 88 which surrounds the stem 86, and seats against the shoulder thereof, so as to urge the valve 85 constantly toward the seat 84. Just above the valve 85 the rod 86 is provided with a large annular flange 89. The passage 83 leads to a valve seat 91 against which a check valve 92 seats. The check valve 92 is guided by a sleeve 93 which slides in a cap 94 threaded into a portion of the casting 81. The cap 94 is vented at 95 and houses a coil spring 96 which serves to urge the valve 92 in a closing direction. The strength of the spring 96 is such that the valve will open under pressure of approximately ten pounds per square inch. Air discharging past the valve 92 flows to atmosphere through the passage 97.

Bolted to the lower face of the casting 81 is a hollow casting 98, a tight joint being secured by use of an intervening gasket. The casting 98 is formed with a passage 99 which communicates with a branch of the auxiliary reservoir passage 71 heretofore mentioned, and communication is through a choke plug 101 inserted in a recess adjacent the plane of separation of the castings 81 and 98.

Formed in the casting 98 is a reservoir 102 and between this reservoir and the projection in which the vent passage 83 is formed, there is mounted an annular cylinder bushing 103 having at its lower end an annular upwardly projecting sealing rim 104. Slidably mounted in the bushing 103 is a piston 105 having a downwardly extending stem 106 which is guided in a bushing 107 in the upwardly extending boss 108. The space below the stem 106 is vented at 109 to the interior of the reservoir 102. Piston 105 is provided with the usual piston ring and carries on its lower face a gasket adapted to seal against the rim 104 when the piston is in its lowermost position. The piston ring and gasket are clearly shown in Figs. 2 and 3, but are not numbered, to avoid confusion. The piston ring prevents ordinary leakage and the gasket produces an absolute seal in the lowermost position of the piston.

The stem 106 of the piston is formed with an axial bore 111 leading from the space above the piston and terminating in an annular groove on the outer face of the stem. In the lowermost position of the piston this groove is slightly below the upper end of the bushing 107 and the clearance between the stem and the bushing, which is somewhat enlarged in Fig. 7 to make it visible, is sufficient to permit charging of the reservoir 102 by way of the port 111 at the proper rate. This rate should be restricted to avoid any tendency to overcharge the reservoir. Should the clearance increase by wear, the resulting overcharge would have a tendency to cause undesired emergency applications, and for this reason an outward opening lightly loaded check valve 112 is provided to vent any overcharge by way of the passage 99 and choke 101 to the auxiliary reservoir by way of passage 71.

In service position upward motion of the piston 105 is arrested by pins 113 fixed thereto, which in such position engage the flange 89 on stem 86. If brake pipe pressure is being reduced at a service rate, i. e., relatively slowly, the resistance of the spring 88 will be sufficient to arrest piston 105 while the valve 85 remains closed. At this time the terminal groove of port 111 clears the upper end of bushing 107. The port is so dimensioned that it will allow pressure fluid from the reservoir 102 to flow back to the brake pipe at the service rate. It is inadequate, however, to keep pace with an emergency reduction, and accordingly upon emergency reduction the piston 105 overpowers spring 88, opens valve 85, and allows brake pipe air to flow by way of passage 83 and check valve 92 to the atmosphere. The space between valve seat 84 and check valve 92 is connected by a passage 114 with the pneumatic emergency switch D and with the actuating motor of the main reservoir by-pass valve E.

It should be remembered that the check valve 92 retains about ten pounds back pressure in the passage 83, and this pressure delivered through the passage 114 is caused to perform certain emergency functions, hereinafter described. This port 114 is the connection by which the emergency valve mechanism of my prior application, above identified, is caused to perform certain special functions in conjunction with electro-pneumatic brake valves.

The mechanism so far described will function to produce emergency applications in the usual way, but it is desired to insure emergency application in the event of a slow depletion of brake pipe pressure. To effect this result there is formed in the casting 98 a second reservoir 115. The passage 116 leads from the reservoir 102 through a valve seat bushing 117 to the interior of the reservoir 115. A check valve 118 coacts with seat 117 and opens toward the reservoir 115 against the opposition of a light spring 119. The purpose in using a light spring is to insure that the reservoir 115 will be charged nearly to the pressure of reservoir 102. Fixed to the valve 118 is a stem 121 which has guiding wings or vanes where it passes through the bushing 117 and which makes a close sliding fit with the bushing 122 so as virtually to preclude leakage at this point. The stem 121 extends through chamber 123 to which leads a branch of the brake pipe passage 64. The passage 116 is wholly out of communication with the brake pipe passage 64. The upper side of the chamber 123 is formed by the lower annular end of a cylindrical bushing 124, such lower end being formed with an upwardly extending annular sealing rim 125. Mounted in the bushing 124 is a cup-shaped valve 126, open at its upper end. At its lower end this valve is in thrust relation with the stem 121 and carries an annular gasket which in the lower position of the valve, seals with the rim 125. The upper end of the valve 126 is slightly reduced or shouldered so as to have a relatively reduced sealing area with the gasket 127 when the valve is in its uppermost position. The gasket 127 is sealed in place by a threaded plug 128 having an axial vent port which connects the interior of the valve 126 to atmosphere, as clearly shown in Fig. 3.

A spring 129 urges the piston downward, the strength of the spring being such that it will be overpowered by a moderate brake pipe pressure, say twenty pounds per square inch. A passage 131 connects with the interior of the bushing 124 at its opposite ends.

Starting with a completely discharged brake system, the valve 126 will be in its lowermost position with its gasket sealing on shoulder 125, but when a brake pipe pressure of approximately twenty pounds has been reached, valve 126 will move up and its reduced end will seal on gasket 127. Such motion of valve 126 allows valve 118 to close, but it is opened by a slight preponderance of pressure in chamber 122 and charging continues. Thereafter as long as brake pipe pressure is above twenty pounds, valve 126 remains in its uppermost position and valve 118 will remain closed no matter how depleted the pressure in chamber 102 may be. But if brake pipe pressure falls below say twenty pounds, as it might do without applying the brakes in the event of a frozen hose or an accidentally closed angle cock, the valve 126 will move suddenly downward, unseat the valve 118 and allow pressure from reservoir 115 to flow into reservoir 102. The sudden access of pressure to the space below piston 125 will produce an immediate emergency application, and this emergency application, like all other emergency applications which occur in this mechanism, will operate through the passage 114 upon the pneumatically operated switch. The passage 131 acts to equalize the pressures above and below the valve 126 as soon as this starts its downward motion and thus serves to accelerate the downward motion of the valve once it has commenced.

Pneumatically operated switch.

The switch unit D is enclosed by a cast body 135 into which is threaded a cup-shaped cylinder 136 closed at its top by a threaded plug 137. The passage 114 is continued in body 135 and cylinder 136 and leads to the upper end of the cylinder space. The lower end of the cylinder is formed with a guide 138 for the hollow stem 139 of a piston 141 which is constantly urged upward by a spring 142. The space below piston 141 is vented by port 143 to switch chamber 144, which in turn is vented to atmosphere at 145.

Fixed in piston 141 and extending downward through hollow-stem 139 is a rod 146, on which is slidably mounted an insulating hub 147 carrying an annular conducting contactor plate 148. A spring 149 urges hub 147 downward relatively to the rod and piston and a stop 151 fixed on rod 146 limits such motion. Fixed on the removable cover of chamber 144 are two contacts 152 insulated from the cover and hence from each other.

When the emergency valve C functions to produce an emergency application pressure retained by valve 92 flows through passage 114 to the space above piston 141, forces this piston downward and causes contactor 148 to bridge contacts 152, 152. These are so connected as to actuate all the electropneumatic emergency valves in the train, as will be described.

The pressure above piston 141 is bled away after the emergency application has been effected, the bleed port being associated with a related mechanism, namely the main reservoir by-pass valve E.

Main reservoir by-pass valve.

This mechanism, indicated at E, is supported by the body casting 155 of the electropneumatic portion E and is housed in a casting 156. In this casting is formed a cylinder 157, to the lower end of which a branch of passage 114 leads. In cylinder 157 there is a piston 158 having a bleed port 159. The cylinder space above piston 158 is vented to atmosphere at 161.

The piston 158 has a stem 162 which makes a close sliding fit in a bushing 163 which closes the upper end of the cylinder. Stem 162 is counterbored at its end to receive the pilot 164 of the by-pass valve 165. This valve is normally held on its seat 166 by spring 167 and by main reservoir pressure arriving through passage 73. Spring 167 is enclosed in a tubular guide 168 which receives an upward extension of valve 165. From this chamber a passage 169 leads to a reversely seated check valve 171 urged closed by spring 172 which will open under preponderating pressure in passage 169 to admit air to a branch of brake cylinder passage 72. A safety valve 173 of usual form (similar to safety valve 41) vents excess brake cylinder pressure in emergency. Valve 173 is set to retain a higher pressure than valve 41 which is operative in service but not in emergency applications (see Figs. 4 and 6).

When the emergency valve C functions pressure retained by loaded valve 92 penetrates, by way of passage 114, to the space below piston 158, forcing this piston up and unseating valve 165. Thereupon main reservoir air from connection 17 flows by passage 73 past valve 165 and through passage 169 to valve 171 which it unseats. The flow continues via passage 72 to the brake cylinder connection 22. Excess pressure is vented by safety valve 173. Bleed port 159 is dimensioned to vent passage 114 and allow valve 165 to close after a proper interval. Such venting also allows spring 142 to restore piston 141, disconnecting contacts 152. The restoring movements of pistons 141 and 158 depend on the relations of piston area to restoring-spring strength, and such movements are not necessarily simultaneous.

Electropneumatic mechanism.

The three units which make up the electropneumatic mechanism consist each of a pneumatically actuated valve and an electrically actuated combined admission and exhaust valve for controlling the pneumatic actuation of said pneumatically actuated valves. In the case of the release valve the exhausting action of the electrically actuated valve also vents the triple valve chamber to initiate or assist in initiating shifting of the triple valve piston 27 to release position.

The pneumatically actuated valve element of the electro-pneumatic emergency unit is located in a chamber 175 to which brake pipe passage 64 leads, and consists of a cup-shaped combined piston and valve 176 mounted in a cylinder bushing 177 and urged into sealing engagement with annular seat 178 by spring 179. The bushing 177 is ported at 181 so that valve 176 controls flow from brake pipe passage 64 to atmosphere by way of passage 182 and so that when it is closed it is subject to brake pipe pressure over a part of its area. When the valve opens the entire area is exposed. Valve 176 is controlled by an electrically actuated valve mechanism in chamber 184 which has a ported inlet valve seat 185 and opposed thereto a ported exhaust valve seat 186. A branch of brake pipe passage 64 leads to the port in inlet seat 185 and exhaust seat 186 is connected to atmosphere by passage 187. Inlet valve 188 is normally held from its seat by spring 189 and is counterbored to receive a stem on exhaust valve 191 which serves to hold the two valves alined and in thrust relation with each other.

Exhaust valve 191 is connected to the armature of the valve actuating magnet indicated generally by the numeral 192. The winding of the magnet 192 is normally deenergized so that spring 189 holds the exhaust valve 191 closed and the inlet valve 188 opened. The excitations of the winding 192 closes the inlet valve 188 and opens the exhaust valve 191. Leading from the chamber 184 is a passage 193 which communicates with the space above the combined piston and valve 176. It follows that under normal conditions this valve is held closed by brake pipe pressure acting on its upper end assisted by the spring 179. In emergency the winding of the actuating magnet 192 is excited. Inlet valve 188 is closed, the exhaust valve 191 is opened, the space above the combined piston and valve 176 is vented to atmosphere, and brake pipe pressure, acting through the port 181, forces the piston and valve 176 upward permitting brake pipe pressure to discharge directly to atmosphere through ported seat 178 and passage 182.

The service valve mechanism is essentially similar, except that it vents brake pipe air to the brake cylinder instead of venting it to atmosphere.

The pneumatically actuated valve element of the electro-pneumatic service unit is mounted in a chamber 195 to which the brake pipe passage 64 also leads, and consists of a cup-shaped combined piston and valve 196 mounted in a cylinder bushing 197 and urged into sealing engagement with an annular seat 198 by a spring 199. The bushing 197 is ported at 201 so that valve 196 controls flow from the brake pipe passage 64 to the brake cylinder passage 72 by way of choke 202, passage 203 and check valve 204. The check valve is provided to prevent back flow from the brake cylinder to the brake pipe. The choke 202 is inserted to reduce the rate of venting flow in service to the desired amount. When the valve 196 opens its entire lower area is exposed to brake pipe pressure, and it then moves to its upward limit of motion and seats against the gasket 205 which is provided to prevent the escape of brake pipe air to atmosphere. No such gasket is necessary on the piston and valve unit 176 because when this opens direct venting to atmosphere is desired.

The valve 196 is controlled by an electrically actuated valve mechanism in a chamber 206. This chamber has a ported inlet valve seat 207 and an opposed ported exhaust valve seat 208. The branch of brake pipe passage 64 leads through a choke 209, to the port in the inlet seat 207. The port in exhaust seat 208 is connected to atmosphere by passage 211. The chamber 206 is connected to the space above the piston valve 196 by a port 210. Inlet valve 212 is urged from its seat by a spring 213 and is counterbored to receive a stem on the exhaust valve 214, the purpose of the stem being to hold the two valves alined in thrust relation with each other. The exhaust valve 214 is connected by a stem 215 with the armature, not shown, of a magnet or solenoid winding 216, similar to the unit 192, and like that unit normally deenergized. From this it follows that the exhaust valve 214 is normally closed, the inlet valve 212 normally opened and the combined piston and valve 196 normally in its lower position in which it seals against gasket 198 and prevents the flow of brake pipe air to the brake cylinder.

When the engineer moves his brake valve to produce a service application, the winding 216 is energized while the brake valve remains in service position. This closes valve 212, opens valve 214, venting the pressure above valve 196 and causing this to open. The choke 202 restricts the rate of flow from brake pipe to brake cylinder. When winding 216 is again deenergized and valve 212 again opens, the choke 209 delays the flow of brake pipe air and causes valve 196 to close gradually.

The release valve mechanism differs materially from the emergency and service valve mechanisms above described. The exhaust passage 76 already mentioned, leads to a chamber 221 in the lower side of which is mounted a seat 222 for a check valve 223 which is urged to its seat by a spring 224. This check valve controls flow to a chamber 225 which is directly connected by passage 226 with the exhaust connection 16. The valve closes in the direction of exhaust flow, and hence when allowed to close it is seated by pressure of the outflowing exhaust as well as by the spring 224. Under normal conditions it is held open by a pilot 227 which extends through the bushing 222 and which engages the end of a piston 228 slidably mounted in a bushing 229 and having a gasket which seals against the annular sealing rim 231 on the upper end of the bushing 229. The piston 228 is not spring urged but is held up by fluid pressure admitted by the electric release valve from the auxiliary reservoir. The reason for having the piston 228 seal against the shoulder 231 is to preclude the leakage of auxiliary reservoir air to atmosphere by way of chamber 225 and passage 226. Chamber 232 below the piston 228 is in communication with the valve chamber 233 and with the releasing vent port 44 by way of passage 74 and its branches. The valve chamber 233 is provided with a ported inlet valve seat 234, whose port is in direct communication with the auxiliary reservoir passage 71 and with a ported exhaust valve seat 235, whose port leads to atmosphere by way of passage 236.

The inlet valve 237 which coacts with seat 234 is urged away from its seat by a spring 238 and is counterbored to receive a projecting stem on the exhaust valve 239 which normally seats on the exhaust valve seat 235. The exhaust valve 239 is unseated and the inlet valve 237 seated in opposition to the action of the spring 238 by an armature connected by a stem 241, the armature being drawn downwardly by the excitation of the windings of the release magnet 242. Under normal conditions the release magnet is deenergized, and auxiliary reservoir air flows through the seat 234 to the chamber 232 and forces piston 228 to its uppermost position. This unseats the valve 223.

When the engineer moves his brake valve to holding position, the windings of the release magnet 242 are excited and its armatures forced downward, closing the inlet valve 237 and opening the exhaust valve 239. This vents pressure from chamber 232 causing piston 229 to move downward and valve 223 to close. The effect of this is to close the exhaust port of the triple valve.

If, as is ordinarily the case, the triple valve is in service, service lap or emergency position (see Figs. 4, 5 and 6) port 62 in the slide valve will register with release vent port 44 in the seat so that the slide valve chamber 25 will be vented to atmosphere by way port 62, port 44, passage 74, valve chamber 233, seat 235 and passage 236, and such venting will continue as long as the valve 239 remains open. The effect is to accelerate the release movement of the piston 27. Moreover, when valve 239 closes and valve 237 opens, as will occur when the engineer's brake valve is moved away from holding position, the air to operate the piston 228 and open the valve 223 is drawn from the slide valve chamber by way of passage 71, and this action further assists the releasing movement of the piston 27. This venting of the slide valve chamber is important in any case because it insures by the simultaneous action of all the release magnets 242 throughout the train, the prompt simultaneous movement of the triple valves to release position.

It is even more important where in emergency position the use of the supplemental reservoir, or the use of the main reservoir pressure, or both, produces a brake cylinder pressure substantially as high or even higher than brake pipe pressure. Under the conditions just recited releasing movement of the triple valve would be sluggish and in some cases would not occur at all except for the provision of this special vent.

In cases where the omission of the main reservoir connection or the main reservoir connection and the auxiliary reservoir connection, precludes the existence of brake cylinder pressures abnormally high relatively to brake pipe pressure, the ports 44 and 62 may be omitted with the consequent omission of the direct venting action. In such cases, however, the withdrawal of air from the slide valve chamber 25 to actuate piston 228, performs a useful service in assisting the releasing movement of the triple valve as already explained.

Train connections.

The diagram of Fig. 1 shows the equipment for two cars. Each car has a pipe bracket A, triple valve B, emergency valve C, pneumatic switch D, emergency by-pass valve E, electro-pneumatic valve F, constructed as already described. The auxiliary reservoir is shown at G, supplemental reservoir at H, brake cylinder at K, the brake pipe at L, and the main reservoir pipe at M. The pipes L and M are coupled from car to car by automatic couplings N, N. The leftward of the two cars is assumed to be a motor car and hence is provided with a main reservoir P which receives its compressed air from any suitable source, such as an electrically driven air compressor, not shown, and understood to be connected to the inlet pipe Q and controlled by any known mechanism.

The engineer's brake valve is not shown, but is understood to be of usual equalizing discharge construction and to have six positions known as "release", in which main reservoir air is fed directly to the brake pipe; "running", in which main reservoir air is fed to the brake pipe through a reducing valve; "holding", which in its pneumatic characteristics is the same as "running", but is different as to electrical characteristics; "lap", in which all brake valve ports are blanked; "service", in which air is vented from the equalizing discharge reservoir to produce a graduated venting of brake pipe through the actuation of the equalizing discharge piston, and "emergency", in which the brake pipe is vented directly to atmosphere.

Valves of this character are well known and require no detailed description. Such valves are connected to the branch pipes $l$, $m$, on the motor car and $l^2$ $m^2$ on the trailer. There may be more than one valve on each car if desired.

Running throughout the length of the train are five electrical conductors which are connected between cars by couplers indicated generally by the letter R. In the diagram the wire 251 serves as a common return and is connected to one terminal of each of the windings 192, 216, and 241. The wire 251 is connected to one terminal, say the negative terminal of each of the batteries 252, there being one battery on each car. The other terminal of each battery is connected, through a corresponding switch 253, of which there is one on each car, with a wire 254 which also extends throughout the train. There is also a service circuit wire 255, a release circuit wire 256, an emergency circuit wire 257, each of which extends throughout the train. The service circuit wire 255 is connected to the remaining terminal of each of the coils 216; the wire 256 is connected to the remaining terminal of each of the coils 242, and the wire 257 is connected to the remaining terminal of each of the coils 192.

As is common practice in the electro-pneumatic art, the engineer's brake valve not only controls the admission and exhaust of pressure fluid to and from the brake pipe, but synchronously therewith establishes certain circuits through the wires 254, 255, 256, 257. The wire 254 is connected with an arcuate contact 258 with which the contactor 259 is always in contact. The handle of the engineer's brake valve is diagrammatically illustrated at 261, and the characteristic positions of this handle in "release" running", "holding", "lap", "service" and "emergency" positions, are designated by legends.

The service wire 255 is connected to a contact 262 which is engaged by the contactor 259 only when the handle 261 is in service position. There is a contact 263 connected to the release wire 256 and engaged by contactor 259 only when the brake handle 261 is in holding position. There is a contact 264 which is so positioned as to be engaged by the contactor 259 only when the valve handle 261 is in emergency position. Contact 264 is connected to emergency wire 257.

The showing of the sketch is only diagrammatic but will indicate that in release, running and lap positions no circuits are established, and the windings 192, 242 and 216 are deenergized. In holding position the winding 242 alone is energized by a circuit established through wire 256. In service position the winding 216 is energized by circuit established through the wire 265 and in emergency winding 192 is energized by a circuit established through the wire 257. It will be observed, therefore, that the difference between holding position and running position is merely whether or not the winding 242 is energized. When energized, the exhaust port from each triple valve will be closed. At the same time the slide valve chamber 25 will be vented to atmosphere and such venting will continue until the slide valve is moved to release position.

The two contacts 152, 152 of the pneumatically operated switch D are connected by wires 265 and 266 with the wire 254 and the emergency wire 257 respectively. When the piston 141 is forced down on any car contact 143 bridges the contacts 152 and establishes a connection between wires 254 and 257 independently of the action of the engineer's brake valve and switch and accordingly the windings 192 throughout the train are excited to produce an immediate emergency application through the venting of the train pipe and the consequent movement of the triple valve to emergency position.

Description of operation.

The operation of the various parts of the device has been set forth in some detail above. Consequently only a general summary of operation, sufficient to set forth the relationship of the various mechanisms, is necessary.

Charging.

On a rise of brake pipe pressure initiated at the engineer's brake valve, piston 27 will move to the right until arrested by the retard stop 37, and charging will take place through the ports 43 and 53. Brake pipe air will flow through passage 64 to the chambers 175 and 195 and inasmuch as the emergency and service windings 192 and 216 are inert, the valve chambers 184 and 206 will be similarly charged. Thus the valves 176 and 196 will be closed. In the emergency valve mechanism piston 105 will be moved to its lowermost position and charging of the reservoirs 102 and 115 will take place, as previously described. If the rise in brake pipe pressure should be more sudden, piston 27 would overpower spring 38, rendering the quick charging port 54 effective and suspending the charging of the supplemental reservoir through ports 52 and 42. Should this quick charging result in overcharging of the auxiliary reservoir, equalization between the auxiliary reservoir and the supplemental reservoir, which occurs immediately piston 27 moves back to normal charging position, will largely dissipate the overcharge.

Service application.

Upon a service reduction of pressure initiated by the engineer's brake valve there will be a reduction of brake pipe pressure through the action of the equalizing discharge valve. On each car also the winding 216 will be energized while the engineer's brake valve is in service position, and this will result in opening of the valve 196 and the venting of the brake pipe passage on each triple valve to the brake cylinder through the choke 202. Either or both means of reducing brake pipe pressure might initiate service application, but the two together produce a simultaneous reduction in all triple valves so that the piston 27 starts toward service position promptly. As it moves toward service, cavity 57 connects ports 53 and 58, thus venting the brake pipe passage 64 into the quick service chamber 39. This local venting further accelerates the movement of the piston 27 to service position. In such position port 60 by its registry with port 47 admits auxiliary reservoir air to the brake cylinder. At the same time port 63 by connecting ports 48 and 49 makes the safety valve 41 effective to limit the brake cylinder pressure in service.

During the operations above described, the emergency winding 192 and the release winding 242 remain deenergized. At this time nothing occurs in the emergency valve except that piston 105 rises until arrested by the engagement of pins 113 with flange 89. Reservoir 102 is vented at a rate commensurate with a service reduction of pressure.

Emergency application.

If the engineer moves his brake valve to emergency position he vents the brake pipe to atmosphere and produces a sudden pronounced reduction of brake pipe pressure. At the same time the emergency magnet valve functions to close supply valve 188 and open exhaust valve 187, thus causing the valve 176 on each triple valve to open and vent the brake pipe directly to atmosphere. The sudden local pressure drop also causes piston 105 to move upward to its extreme emergency position, opening the valve 85 and further venting the brake pipe through passage 83 and valve 92. The brake pipe is thus rapidly vented by three independent agencies. The piston 23 moves rapidly leftward to its limit of motion, seats against the cap gasket, and so positions the slide valve that both the auxiliary reservoir and the supplemental reservoir equalize with the brake cylinder. At the same time the back pressure retained by the valve 92 flows through the passage 114 and forces the piston 141 down to bridge the contact 152. Since the emergency winding 192 is assumed already to be energized, the action of the pneumatic switch D produces no additional result, but it is an additional safety feature providing for possible failure of a train circuit, by energizing the emergency winding on a particular car directly through the circuit and battery on that car.

The pressure in passage 114 also is communicated to the space below piston 158 and forces this upward to unseat valve 165 and admit main reservoir air directly to the brake cylinder passage 72 by way of check valve 171. Since main reservoir pressure is much higher than that carried in the auxiliary or supplemental reservoir, or the brake pipe, the opening of valve 165 establishes an abnormally high brake cylinder pressure. Excess pressure is vented by the safety valve 173, the safety valve 41 which responds at a lower pressure, being disconnected through the action of the triple slide valve 35 (see Fig. 6).

In the event that a portion of the train pipe were cut off through a frozen hose or an accidentally closed angle cock, the gradual depletion of pressure in that isolated portion of the brake pipe, would, as above explained, ultimately lead to the downward shifting of the piston valve 126, followed by the motion of the piston 105 to emergency position. It is assumed that when this occurs the engineer's brake valve is in release or running position. Pressure retained by the valve 92 acting through the passage 114 actuates the pneumatically operated switch D and through the connections described, energizes the emergency windings 192 on all the cars throughout the train. This produces an immediately emergency application through the response of all the triple valves on the train to the resulting local venting of the brake pipe to atmosphere at each valve. Response of all the emergency valves C would bring about an admission of main reservoir air in the manner already described.

Release after service.

In release after service the pressure in the valve chamber 25 is less than normal brake pipe pressure, and in some cases satisfactory results can be secured by moving the engineer's brake valve to running position. But the better practice is to move the valve to holding position to accelerate the resulting movement of the pistons 27 and when they have responded, to move the engineer's brake valve to running position. It will be observed that gradual release can be secured by moving the engineer's brake valve handle alternately between running and holding positions. Both these positions imply the motion of the triple valve to release position, but in holding position the release port is blanked by the electro-pneumatic valve.

Release after emergency.

After an emergency application, in which main reservoir air has been admitted to the brake cylinder, brake cylinder pressure may be as high or higher than the nomal brake pipe pressure. To release, under these conditions, the engineer's brake valve must be moved to holding position, in which position the slide valve chamber 25 is vented to atmosphere, as already described. When this has caused the triple valve piston to move to release position, venting will be stopped, because port 62 will have moved out of registry with port 44. The engineer then moves his brake valve handle to running position. Bridging of the contacts 152 and the opening of the valves 165 are only temporary, in any event, for the reason that the port 159 soon vents the pressure retained in the passage 114 by the valve 92.

It should be clearly understood that in the diagrammatic Figure 1, there have been included only those parts necessary to an understanding of the present invention. Various details, in addition to the engineer's brake valve, have been omitted, because they merely conform to standard practice and their presence would confuse the diagram.

It is not always necessary to use a valve which gives an emergency pressure as high as or higher than brake pipe pressure, and in such case the main reservoir connection 17 and the by-pass valve mechanism E can be omitted. The same is true of the supplemental reservoir. The omission of the supplemental reservoir, and particularly the omission of the main reservoir connections, reduce in a large measure the necessity for the ports 62 and 44, and in some cases these release vent ports may be omitted. In such case there is material advantage in deriving the pressure fluid to actuate the piston 228 directly from the slide valve chamber 25 for this accelerates the releasing of the piston 27.

Heretofore in devices of this general character it has been the practice to derive the air for operating the release valve piston 228 from the brake pipe, just as is done in the present structure in the case of an emergency valve 176 and the service valve 196. The withdrawal of air from the brake pipe during release, has the effect of retarding the releasing motion of the piston, so that as contrasted with the old relation, the one here described presents a marked improvement. The use of a slow reduction emergency valve, broadly considered, is claimed in my prior application above identified, but derives peculiar advantage in conjunction with the pneumatically operated switch D, because when so combined the slow emergency application is produced simultaneously on all the cars of the train.

Various changes in the specific structure of the component elements are obviously possible and are contemplated.

What is claimed is,—

1. The combination of a brake pipe; an auxiliary reservoir; a triple valve having a slide valve in a chamber connected with the auxiliary reservoir, and a piston interposed between said chamber and the brake pipe; means for venting said chamber; electrically controlled means for actuating said venting means, and means for rendering said venting means ineffective when said triple valve is in release position.

2. The combination of a brake pipe; an auxiliary reservoir; a triple valve having a slide valve in a chamber connected with the auxiliary reservoir, and a piston interposed between said chamber and the brake pipe; means for retarding flow from said auxiliary reservoir to said chamber; means for venting said chamber; and electrically controlled means for actuating said venting means.

3. The combination of a brake pipe; an auxiliary reservoir; a triple valve having a slide valve in a chamber connected with the auxiliary reservoir, and a piston interposed between said chamber and the brake pipe; a vent conduit leading from said chamber and controlled by said slide valve so as to be open in lap and application positions; and an electrically controlled valve also controlling said vent conduit.

4. The combination of a brake pipe; an auxiliary reservoir; a triple valve having a slide valve in a chamber connected with the auxiliary reservoir, and a piston interposed between said chamber and the brake pipe; means for retarding flow from said auxiliary reservoir to said chamber; a vent conduit leading from said chamber and controlled by said slide valve so as to be open in lap and application positions; and an electrically controlled valve also controlling said vent conduit.

5. The combination of a brake pipe; an auxiliary reservoir; a triple valve having a slide valve in a chamber connected with the auxiliary reservoir; and a piston interposed between said chamber and the brake pipe; a vent conduit leading from said chamber and controlled by said slide valve so as to be open in application and lap positions; a second valve also controlling said vent conduit; and means independent of the brake pipe for actuating said second valve.

6. The combination of a brake pipe; an auxiliary reservoir; a triple valve having a slide valve in a chamber connected with the auxiliary reservoir, and a piston interposed between said chamber and the brake pipe; means for retarding flow from said auxiliary reservoir to said chamber; a vent conduit leading from said chamber and controlled by said slide valve so as to be open in application and lap positions; a second valve also controlling said vent conduit; and means independent of the brake pipe for actuating said second valve.

7. The combination of a main reservoir charged at a relatively high pressure; a brake pipe fed therefrom and maintained under a lower pressure; an auxiliary reservoir; a brake cylinder; a triple valve having a slide valve in a chamber connected with the auxiliary reservoir and a piston interposed between said chamber and the brake pipe, the triple valve controlling the charging of the auxiliary reservoir from the brake pipe, the admission of auxiliary reservoir air through said chamber to the brake cylinder in service and emergency, and the exhaust of pressure from the brake cylinder in release, said slide valve controlling a vent port open only in lap and application positions and leading from said chamber; an emergency valve mechanism associated with said triple valve and serving in emergency applications to admit main reservoir air to the brake cylinder; and an electrically controlled valve independently controlling said vent port.

8. The combination of a main reservoir charged at a relatively high pressure; a brake pipe fed therefrom and maintained under a lower pressure; an auxiliary reservoir; a brake cylinder; a triple valve having a slide valve in a chamber connected with the auxiliary reservoir and a piston interposed between said chamber and the brake pipe, the triple valve controlling the charging of the auxiliary reservoir from the brake pipe, the admission of auxiliary reservoir air through said chamber to the brake cylinder in service and emergency, and the exhaust of pressure from the brake cylinder in release, said slide valve controlling a vent port open only in lap and application positions and leading from said chamber; means for retarding flow from the auxiliary reservoir; an emergency valve mechanism associated with said triple valve and serving in emergency applications to admit main reservoir air to the brake cylinder; and an electrically controlled valve independently controlling said vent port.

9. The combination of a main reservoir charged at a relatively high pressure; a brake pipe fed therefrom and maintained under a lower pressure; an auxiliary reservoir; a brake cylinder; a triple valve having a slide valve in a chamber connected with the auxiliary reservoir and a piston interposed between said chamber and the brake pipe, the triple valve controlling the charging of the auxiliary reservoir from the brake pipe, the admission of auxiliary reservoir air through said chamber to the brake cylinder in service and emergency, and the exhaust of pressure from the brake cylinder in release, said slide valve controlling a vent port open only in lap and application positions and leading from said chamber; an emergency valve mechanism associated with said triple valve and serving in emergency applications to admit main reservoir air to the brake cylinder; an independent valve also controlling said vent port; and means independent of the brake pipe for actuating said independent valve.

10. In an electro-pneumatic brake system, the combination of a brake pipe; an auxiliary reservoir; a triple valve adapted to admit air from said reservoir to the brake cylinder and to exhaust air from said brake cylinder, said valve including a triple piston subject on its opposite sides to brake pipe pressure and to auxiliary reservoir pressure; an electrically controlled pneumatically actuated retainer serving when operated to open and close the brake cylinder exhaust; and connections for conveying operating pressure fluid for said pneumatically actuated retainer from the space within the triple valve on the reservoir side of said triple piston, whereby motion of the triple valve to release and recharge position is accelerated by the operation of said retainer.

11. In an electro-pneumatic brake system, the combination of a brake pipe; an auxiliary reservoir; a triple valve adapted to admit air from said reservoir to the brake cylinder and to exhaust air from the brake cylinder, said valve including a slide valve chamber and a triple piston interposed between the slide valve chamber and the brake pipe; a retainer valve controlling the exhaust passing through said triple valve; means urging said retainer valve closed; a pressure motor arranged to overpower said means when pressure is admitted thereto; admission and relief valve mechanism operable alternatively to admit air from the slide valve chamber to said pressure motor, and to exhaust said motor; and electrical means for actuating said admission and relief valve mechanism.

12. In an electropneumatic brake system, the combination of a brake pipe; an auxiliary reservoir; a triple valve adapted to admit air from said reservoir to the brake cylinder and to exhaust air from the brake cylinder, said valve including a slide valve chamber and a triple piston interposed between the slide valve chamber and the brake pipe; a retainer valve controlling the exhaust passing through said triple valve; means urging said retainer valve closed; a pressure motor arranged to overpower said means when pressure is admitted thereto; admission and relief valve mechanism operable alternatively to admit air from the slide valve chamber to said pressure motor, and to exhaust said motor; and means independent of the brake pipe for actuating said admission and release valve mechanism.

13. In an electropneumatic brake system, the combination of a brake pipe; an auxiliary reservoir; another reservoir; a triple valve mechanism adapted to admit air from one or both said reservoirs according to the nature of the brake application, and to exhaust the brake cylinder, said valve mechanism including a triple piston, subject in one direction to brake pipe pressure; an electrically controlled retainer mechanism operable to close the triple valve exhaust; and connections controlled by said electrically controlled mechanism and serving when said exhaust is closed to vent from the triple valve pressure acting on the triple piston in opposition to brake pipe pressure.

14. In an electropneumatic brake system, the combination of a brake pipe; an auxiliary reservoir; a triple valve mechanism adapted to admit air from said reservoir, and to exhaust the brake cylinder, said valve mechanism including a triple piston subject in one direction to brake pipe pressure; an electrically controlled retainer mechanism operable to close the triple valve exhaust; and connections controlled by said electrically controlled mechanism and serving to vent from the triple valve pressure acting on the triple piston in opposition to brake pipe pressure.

15. In an electropneumatic brake system, the combination of a brake pipe; an auxiliary reservoir; another reservoir; a triple valve mechanism adapted to admit air from one or both said reservoirs according to the nature of the brake application, and to exhaust the brake cylinder, said valve including a triple piston subject in one direction to brake pipe pressure; a retainer valve controlling the exhaust passing through the triple valve; means urging said valve closed; a pressure motor arranged to overpower said means when pressure is admitted thereto; admission and relief valve mechanism operable alternately to admit air from the auxiliary reservoir side of the triple piston to said pressure motor and to vent said motor; and a vent connection from the auxiliary reservoir side of the triple piston to atmosphere and controlled conjointly by said triple valve and said relief valve in such manner as to be open when said relief valve is open and the triple valve is in a brake applying position.

16. In an electro-pneumatic brake system, the combination of a brake pipe; an auxiliary reservoir; a triple valve mechanism adapted to admit air from said reservoir, and to exhaust the brake cylinder, said valve including a triple piston subject in one direction to brake pipe pressure; a retainer valve controlling the exhaust passing through the triple valve; means urging said valve closed; a pressure motor arranged to overpower said means when pressure is admitted thereto; admission and relief valve mechanism operable alternately to admit air from the auxiliary reservoir side of the triple piston to said pressure motor and to vent said motor; and a vent connection from the auxiliary reservoir side of the triple piston to atmosphere controlled conjointly by said triple valve and said relief valve in such manner as to be open when said relief valve is open and the triple valve is in a brake applying position.

17. In an electro-pneumatic brake system, the combination of a brake pipe; an auxiliary reservoir; a supplemental reservoir; a brake cylinder; a triple valve controlling the charging of both reservoirs, the release of pressure from the brake cylinder, the admission of auxiliary reservoir air to the brake cylinder in service applications and the admission of air from both reservoirs to the brake cylinder in emergency applications; an electrically actuated emergency valve connected to cause the emergency function of the triple valve; a pneumatically actuated emergency valve controlled by brake pipe pressure and connected to cause the emergency function of the triple valve; and means rendered effective by abnormal depletion of brake pipe pressure to render an emergency valve active.

18. In an electro-pneumatic brake system, the combination of a brake pipe; an auxiliary reservoir; a supplemental reservoir; a brake cylinder; a triple valve controlling the charging of both reservoirs, the release of pressure from the brake cylinder, the admission of auxiliary reservoir air to the brake cylinder in service applications and the admission of air from both reservoirs to the brake cylinder in emergency applications; an electrically actuated emergency valve connected to cause the emergency function of the triple valve; a pneumatically actuated emergency valve controlled by brake pipe pressure and connected to cause the emergency function of the triple valve; and means rendered effective by abnormal depletion of brake pipe pressure to render both of said emergency valves active.

19. In an electro-pneumatic brake system, the combination of a brake pipe; an auxiliary reservoir; a supplemental reservoir; a brake cylinder; a triple valve controlling the charging of both reservoirs, the release of pressure from the brake cylinder, the admission of auxiliary reservoir air to the brake cylinder in service applications and the admission of air from both reservoirs to the brake cylinder in emergency applications; an electrically actuated emergency valve connected to cause the emergency function of the triple valve; a pneumatically actuated emergency valve controlled by brake pipe pressure and connected to cause the emergency function of the triple valve; means rendered effective by abnormal depletion of brake pipe pressure to render an emergency valve active, and electric and pneumatic connections between said two emergency valves, whereby the functioning of either causes the other to function.

20. In an electro-pneumatic brake system, the combination of a brake pipe; an auxiliary reservoir; a supplemental reservoir; a brake cylinder; a triple valve controlling the charging of both reservoirs, the release of pressure from the brake cylinder, the admission of auxiliary reservoir air to the brake cylinder in service applications and the admission of air from both reservoirs to the brake cylinder in emergency applications; an electrically actuated emergency valve connected to cause the emergency function of the triple valve; a pneumatically actuated emergency valve controlled by brake pipe pressure and connected to cause the emergency function of the triple valve; means rendered effective by abnormal depletion of brake pipe pressure to render both of said emergency valves active; and electric and pneumatic connections between said two emergency valves, whereby the functioning of either causes the other to function.

21. In an electro-pneumatic brake system for use on vehicles to be connected in trains, the combination of a brake pipe; an auxiliary reservoir; a supplemental reservoir; a brake cylinder; a triple valve controlling the charging of both reservoirs, the release of pressure from the brake cylinder, the admission of auxiliary reservoir air to the brake cylinder in service applications and the admission of air from both reservoirs to the brake cylinder in emergency applications; an electrically actuated emergency valve connected to cause the emergency function of the triple valve; a pneumatically actuated emergency valve controlled by brake pipe pressure and connected to cause the emergency function of the triple valve; means rendered effective by abnormal depletion of brake pipe pressure to render an emergency valve active; and electrical connections for establishing a circuit including the electrically actuated emergency valves of various vehicles connected in a train, whereby if an emergency valve of one vehicle functions all function.

22. In an electro-pneumatic brake system for use on vehicles to be connected in trains, the combination of a brake pipe; an auxiliary reservoir; a supplemental reservoir; a brake cylinder; a triple valve controlling the charging of both reservoirs, the release of pressure from the brake cylinder, the admission of auxiliary reservoir air to the brake cylinder in service applications and the admission of air from both reservoirs to the brake cylinder in emergency applications; an electrically actuated emergency valve connected to cause the emergency function of the triple valve; a pneumatically actuated emergency valve controlled by brake pipe pressure and connected to cause the emergency function of the triple valve; means rendered effective by abnormal depletion of brake pipe pressure to render both of said emergency valve active; and electrical connections for establishing a circuit including the electrically actuated emergency valves of various vehicles connected in a train, whereby if an emergency valve of one vehicle functions all function.

23. In an electro-pneumatic brake system, for use on vehicles to be connected in trains, the combination of a brake pipe; an auxiliary reservoir; a supplemental reservoir; a brake cylinder; a triple valve controlling the charging of both reservoirs, the release of pressure from the brake cylinder, the admission of auxiliary reservoir air to the brake cylinder in service applications and the admission of air from both reservoirs to the brake cylinder in emergency applications; an electrically actuated emergency valve connected to cause the emergency function of the triple valve; a pneumatically actuated emergency valve controlled by brake pipe pressure and connected to cause the emergency function of the triple valve; means rendered effective by abnormal depletion of brake pipe pressure to render an emergency valve active; electric and pneumatic connections between said two emergency valves whereby the functioning of either causes the other to function; and electrical connections for establishing a circuit including the electrically actuated emergency valves of various vehicles connected in a train, whereby if an emergency valve of one vehicle functions all function.

24. In an electro-pneumatic brake system, for use on vehicles to be connected in trains, the combination of a brake pipe; an auxiliary reservoir; a supplemental reservoir; a brake cylinder; a triple valve controlling the charging of both reservoirs, the release of pressure from the brake cylinder, the admission of auxiliary reservoir air to the brake cylinder in service applications and the admission of air from both reservoirs to the brake cylinder in emergency applications; an electrically actuated emergency valve connected to cause the emergency function of the triple valve; a pneumatically actuated emergency valve controlled by brake pipe pressure and connected to cause the emergency function of the triple valve; means rendered effective by abnormal depletion of brake pipe pressure to render both of said emergency valves active; electric and pneumatic connections between said two emergency valves, whereby the functioning of either causes the other to function; and electrical connections for establishing a circuit including the electrically actuated emergency valves of various vehicles connected in a train, whereby if an emergency valve of one vehicle functions all function.

25. In an electro-pneumatic brake system for use with vehicles to be connected in trains, the combination of a main reservoir charged at relatively high pressure; a brake pipe fed therefrom at a lower pressure; an auxiliary reservoir; a brake cylinder; a triple valve controlling the charging of said reservoir from the brake pipe, the release of pressure from the brake cylinder, and the admission of auxiliary reservoir pressure to the brake cylinder; emergency valve mechanism operable pneumatically by brake pipe pressure and serving to admit main reservoir air to the brake cylinder; electrical means for causing said emergency valve mechanism to function by locally depleting brake pipe pressure; and pneumatic means associated with said emergency valve and rendered effective by abnormal depletion of brake pipe pressure to cause said emergency valve to function.

26. In an electro-pneumatic brake system for use with vehicles to be connected in trains, the combination of a main reservoir charged at relatively high pressure; a brake pipe fed therefrom at a lower pressure; an auxiliary reservoir; a brake cylinder; a triple valve controlling the charging of said reservoir from the brake pipe, the release of pressure from the brake cylinder and the admission of auxiliary reservoir pressure to the brake cylinder; emergency valve mechanism operable pneumatically by brake pipe pressure and serving to admit main reservoir air to the brake cylinder; electrical means for causing said emergency valve mechanism to function by locally depleting brake pipe pressure; pneumatic means associated with said emergency valve and rendered effective by abnormal depletion of brake pipe pressure to cause said emergency valve to function; an electric switch adapted to be actuated by the functioning of said emergency valve; and connections for establishing a circuit controlled by said switch, including said electrical means and capable of connection with similar circuits on other similarly equipped vehicles when connected in a train, to ensure simultaneous operation of all emergency valves if one of said emergency valves should function.

27. In an electro-pneumatic brake system, the combination of a plurality of automatic air brake car equipments connected in a train by a brake pipe; electrical application producing means associated with each car equipment; an automatic mechanism including an electric switch associated with each car equipment and adapted to respond to abnormal depletion of brake pipe pressure; and electric connections arranged to place each of said switches in controlling relation to the electrical application producing means of equipments connected by said brake pipe.

28. In an electro-pneumatic brake system, the combination of a plurality of automatic air brake car equipments connected in a train by a brake pipe, and each including a triple valve and an emergency valve controlled by brake pipe pressure; electrical brake pipe venting means associated with each car equipment; means associated with each emergency valve and responsive to abnormal depletion of brake pipe pressure to cause said valve to function; a switch operated by the functioning of the emergency valve; and electric connections arranged to place each such switch in controlling relation with the electrical brake pipe venting means of the car equipments connected by said brake pipe.

29. In an electro-pneumatic brake system, the combination of a triple valve; an electrically actuated emergency valve connected to cause the emergency function of the triple valve; a pneumatically actuated emergency valve connected to cause independently an emergency function of the triple valve; connections between said emergency valves whereby the functioning of either causes the other to function; and connections between a plurality of said electrically actuated emergency valves in a train whereby if one functions all function.

30. In an electro-pneumatic brake system, the combination of a triple valve; an electrically actuated emergency valve connected to cause the emergency function of the triple valve; a pneumatically actuated emergency valve connected to cause independently an emergency function of the triple valve; and connections between said emergency valves whereby the functioning of either causes the other to function.

31. The combination of a brake pipe; an auxiliary reservoir; a brake cylinder; a triple valve; an emergency valve operable by brake pipe pressure independently of the triple valve and functioning to discharge air from the brake pipe; an electrically actuated vent valve operable to vent air from the brake pipe; and a pneumatically actuated switch connected to be closed as an incident to the discharge of air through the first named emergency valve and serving when closed to establish an energizing circuit through said electrically actuated vent valve.

32. A brake equipment for vehicles intended to be coupled in trains, comprising in combination a brake pipe; an auxiliary reservoir; a brake cylinder; a triple valve; an emergency valve operable by brake pipe pressure independently of the triple valve and functioning to discharge air from the brake pipe; an electrically actuated vent valve operable to vent air from the brake pipe; a pneumatically actuated switch arranged to be closed by the discharge of air through the first named emergency valve; and electrical connections adapted to establish an energizing circuit through said electrically actuated vent valve and other similar valves of connected vehicles.

33. The combination of a main reservoir charged at relatively high pressure; a brake pipe fed therefrom at a lower pressure; an auxiliary reservoir; a brake cylinder; a triple valve associated with said reservoir brake pipe and brake cylinder; an emergency valve operable by brake pipe pressure independently of the triple valve and functioning to discharge air from the brake pipe; and a pneumatically actuated valve arranged to be opened by the discharge of air through said emergency valve and serving when opened to admit air from the main reservoir to the brake cylinder.

34. The combination of a main reservoir charged at relatively high pressure; a brake pipe fed therefrom at a lower pressure; an auxiliary reservoir; a brake cylinder; a triple valve associated with said reservoir brake pipe and brake cylinder; an emergency valve operable by brake pipe pressure independently of the triple valve and functioning to discharge air from the brake pipe; a pneumatically actuated valve arranged to be opened as an incident to the discharge of air through said emergency valve and serving when opened to admit air from the main reservoir to the brake cylinder; an electrically actuated vent valve operable to vent air from the brake pipe; and a pneumatically actuated switch arranged to be closed by the discharge of air through said emergency valve, and serving when closed to establish an energizing circuit through said electrically actuated vent valve.

35. In an automatic brake system, the combination of an auxiliary reservoir; a supplemental reservoir; a brake cylinder; a triple valve controlling the charging of said reservoirs, the admission of reservoir pressure to the brake cylinder and exhaust of the brake cylinder; a main reservoir; an emergency valve controlling the flow of main reservoir air to the brake cylinder and auxiliary reservoir; and a check valve preventing flow of such emergency reservoir air to the supplemental reservoir.

In testimony whereof I have signed my name to this specification.

CHARLES A. CAMPBELL.